(12) United States Patent
Melvin

(10) Patent No.: US 7,482,910 B2
(45) Date of Patent: Jan. 27, 2009

(54) APPARATUS, SYSTEM, AND COMPUTER PROGRAM PRODUCT FOR PRESENTING UNSOLICITED INFORMATION TO A VEHICLE OR INDIVIDUAL

(75) Inventor: Stephen Waller Melvin, San Francisco, CA (US)

(73) Assignee: Baglador S.A. LLC, Wilmington, DE (US)

( * ) Notice: Subject to any disclaimer, the term of this patent is extended or adjusted under 35 U.S.C. 154(b) by 264 days.

(21) Appl. No.: 11/513,031

(22) Filed: Aug. 31, 2006

(65) Prior Publication Data

US 2007/0080813 A1      Apr. 12, 2007

Related U.S. Application Data

(63) Continuation of application No. 11/161,168, filed on Jul. 25, 2005, now Pat. No. 7,319,379, which is a continuation of application No. 10/249,904, filed on May 16, 2003, now Pat. No. 6,922,138.

(60) Provisional application No. 60/319,251, filed on May 16, 2002.

(51) Int. Cl.
| | |
|---|---|
| B60Q 1/00 | (2006.01) |
| G08B 7/00 | (2006.01) |
| G08G 1/065 | (2006.01) |
| G08G 1/123 | (2006.01) |
| G05D 1/00 | (2006.01) |
| G05D 3/00 | (2006.01) |
| G06Q 30/00 | (2006.01) |
| G06Q 40/00 | (2006.01) |
| G09F 21/04 | (2006.01) |

(52) U.S. Cl. .............. 340/438; 340/438; 340/691.3; 340/691.6; 340/573.1; 340/928; 340/988; 701/1; 701/22; 701/23; 701/24; 705/14; 705/43; 40/592

(58) Field of Classification Search ............ 340/438, 340/691.3, 691.6, 928, 988; 701/1, 22, 23, 701/24; 705/1, 5, 14, 43; 40/592

See application file for complete search history.

(56) References Cited

U.S. PATENT DOCUMENTS

| | | | |
|---|---|---|---|
| 4,934,079 A | 6/1990 | Hoshi | |
| 6,060,993 A | 5/2000 | Cohen | |
| 6,484,148 B1 | 11/2002 | Boyd | |
| 6,587,755 B1 | 7/2003 | Smith et al. | |
| 6,690,286 B2 | 2/2004 | Polyakov | |
| 6,922,138 B2 | 7/2005 | Melvin | |
| 6,992,138 B2 * | 1/2006 | Tsuji et al. | 525/131 |
| 7,319,379 B1 * | 1/2008 | Melvin | 340/438 |
| 2002/0097193 A1 | 7/2002 | Powers | |
| 2002/0138433 A1 | 9/2002 | Black et al. | |
| 2003/0088463 A1 | 5/2003 | Kanevsky et al. | |
| 2004/0036622 A1 * | 2/2004 | Dukach et al. | 340/691.6 |

* cited by examiner

*Primary Examiner*—Benjamin C Lee
*Assistant Examiner*—Lam P Pham
(74) *Attorney, Agent, or Firm*—Sterne, Kessler, Goldstein & Fox P.L.L.C.

(57) ABSTRACT

A system for providing directed advertising or informational messages specific to individual persons or vehicles. The system encompasses a sensing and evaluation mechanism to detect persons or vehicles, in conjunction with a billboard or other display device capable of delivering a message specific to one or more individuals.

42 Claims, 3 Drawing Sheets

APPARATUS, SYSTEM, AND COMPUTER PROGRAM PRODUCT FOR PRESENTING UNSOLICITED INFORMATION TO A VEHICLE OR INDIVIDUAL

CROSS-REFERENCE TO RELATED APPLICATIONS

This application is a continuation of U.S. application Ser. No. 11/161,168, filed Jul. 25, 2005, now U.S. Pat. No. 7,319,379 which is a continuation of U.S. application Ser. No. 10/249,904, filed May 16, 2003, now U.S. Pat. No. 6,922,138 issued Aug. 31, 2006, which claims the benefit of U.S. Provisional Application No. 60/319,251, filed May 16, 2002.

FIELD OF THE INVENTION

The present invention relates to the field of advertising, and more specifically to the public display of unsolicited advertising and informational messages.

BACKGROUND OF THE INVENTION

Outdoor billboards are used to display advertising to occupants of vehicles in motion on public roadways. Typically billboards are changed infrequently, on the order of monthly. Furthermore, due to the lack of selectivity, the content of such billboards are limited to subject matters that apply to a large group of the driving public. It is not cost effective to display on such billboards advertisements or information directed to a small segment of the population. It is also impossible to display different messages to different vehicles, limiting the return on investment for billboard operators.

What is needed is a system where directed advertising can be made efficiently to vehicles in motion. Directed advertising provides a more cost effective solution for advertisers and an increased income for billboard operators. Furthermore, if it were possible to display different messages to different vehicles, based on occupant profiles, maximum flexibility would be afforded to advertisers to market specific products to customized markets. The foregoing limitations and desired solutions equally apply to billboards and other displays viewed by individuals on foot or using other modes of transportation, such as bicycles, motorcycles, or boats.

SUMMARY OF INVENTION

An aspect of the present invention is to provide a method for delivering advertising or information messages specific to the occupants of a certain vehicle. Each vehicle is sensed, information is extracted from the sensed data and a message is selected to display. The information extracted from the sensed information can be the make, model, year, color, number of passengers, physical condition of the vehicle, the license plate number, information from the license plate frame and/or information from bumper stickers.

In one aspect of the present invention, a profile of the occupants of a sensed vehicle is formed and this occupant profile is used in the process of selecting a message to display. The present invention can operate in real-time to display different messages to each vehicle traveling at high speed on a multi-lane freeway. A further aspect of the present invention is to maintain information regarding which messages have been displayed to which vehicles and how often, for purposes of billing or statistical analysis.

Another aspect of the present invention is to provide an apparatus for sensing vehicles in motion, processing sensed data, selecting a message to display to the sensed vehicle and delivering that message to a display device. The processing apparatus preferably analyzes sensed data to extract information and includes a database that is used to assist in the forming of an occupant profile based on the extracted information.

DETAILED DESCRIPTION

The present invention relates to a system in which vehicle specific or person specific advertising or other informational messages are provided automatically. In one embodiment, vehicles may be in motion, possibly at high speed. The system senses characteristics of each vehicle, processes that information, and displays one or more messages to the occupant or occupants of the sensed vehicle. The display device can consist of one or more electronic outdoor billboards or electronic display devices, oriented so as to be viewable by the operator and/or passengers of each vehicle.

Figure 1:
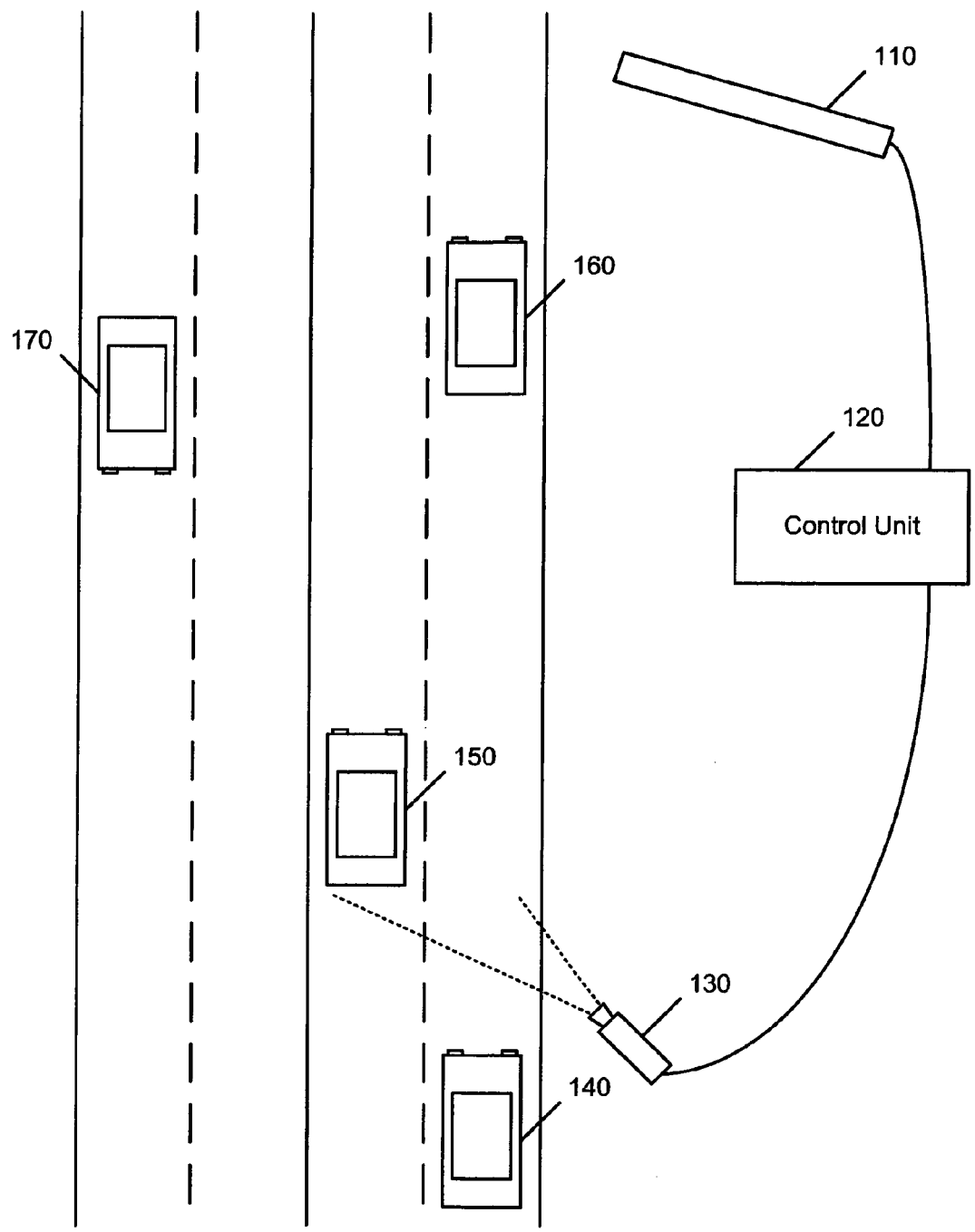
FIG. 1 illustrates a physical layout of an embodiment of the present invention.

It is intended that the sensing, processing and display of messages occur in real-time. If the vehicle is in motion, the time between when the sensing device sense the vehicle and when the vehicle comes into view of the display device determines the maximum processing time. For example, if a vehicle is traveling at 60 miles per hour and the vehicle is imaged 100 yards before the display is viewable, the processing must take less than approximately 3.4 seconds. The computational resources and complexity of the processing must be chosen appropriate to the time constraints given the physical layout of the overall system FIG. 1 illustrates one embodiment and shows the physical layout of the present invention. Camera 130 is coupled to control unit 120, which is coupled to display device 110. Vehicles 140, 150, 160 and 170 represent vehicles, such as private automobiles, in motion on a road or highway. Camera 130 is a sensing device that is positioned to image vehicles as they pass. In FIG. 1, the rear of vehicle 150 is positioned to be sensed by camera 130. In alternative embodiments, the sensing mechanism can consist of multiple cameras at different positions or focused on different lanes. It may be desirable to observe both the front and rear of each vehicle, or just one or the other. A digital camera with a high speed electronic shutter feature attached to a digital image capture system can be used to retrieve the images from each vehicle. Camera 130 may be an infrared camera to reliably sense information at night. In alternative embodiments, other vehicles, such as boats or motorcycles may be sensed rather than automobiles. In still other embodiments, individual people, such as those walking on a public sidewalk, may be the subjects of the sensing device.

It is also possible to sense vehicles other than through optical means. For example, radio frequency transmitters could be used. This would require vehicles to be equipped with specific equipment. In certain circumstances it may be desirable to display messages only to specifically equipped vehicles rather than to the public at large. Audio detection of persons or vehicles would also be possible and sophisticated techniques could be used to extract information from detected sounds.

Display device 110 is provided such that the driver and/or other occupants of each vehicle can observe it. Display device 110 can be an electronic billboard capable of displaying graphic images and text. The display can be oriented such that it is observable by a single vehicle at a time, or by several vehicles. In alternative embodiments, there could be a display device for each lane, rather than a single device viewable by all lanes.

Control unit 120 is responsible for processing the sensed data and driving the display device in real time. The processing may consist of several steps as described below. If the vehicle is in motion, the time between when the car is imaged and when it is positioned such that the display device is observable constitutes the allowable processing time. The time during which the driver and/or other occupant of the vehicle can observe the display device is the time during which the message must be displayed. Multiple messages can be displayed during the time in which the display device is viewable. In the case that multiple vehicles can view the display at the same time, messages can be displayed for each vehicle, or a different selection can be made based on a combined viewing audience.

Figure 2:
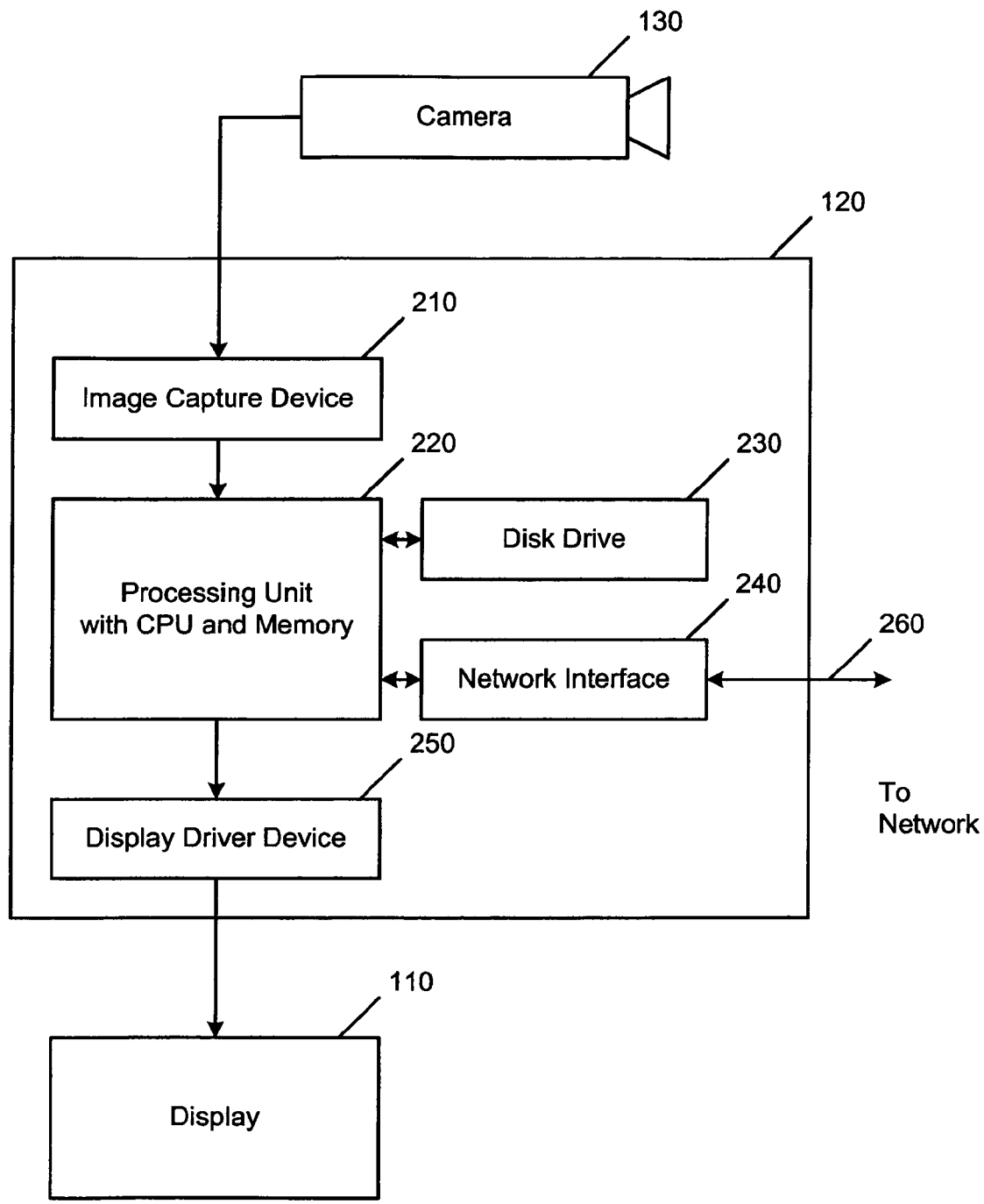
FIG. 2 illustrates an embodiment of the control unit.

Referring now to FIG. 2, detail of one embodiment of control unit 120 is illustrated. Camera 130 is coupled to image capture device 210, which is coupled to processing unit 220. Processing unit 220 is coupled to disk drive 230, network interface 240 and to display driver 250. Display driver 250 is coupled to display device 110. Network interface 240 is coupled through path 260 to a network.

Image capture device 210 receives sensed camera data and stores it for processing. Processing unit 220 processes the sensed camera data, utilizing local information stored in memory, local information stored on disk drive 230, or remote information received via network interface 240. After processing, messages are delivered to display device 110 through display drive 250.

The purpose of control unit 120 is to process the image data captured by the sensing system and to select, based on the information extracted, one or more messages to be displayed to the person or vehicle. The processing system can be generally split into two mechanisms: information extraction and message selection.

Figure 3:
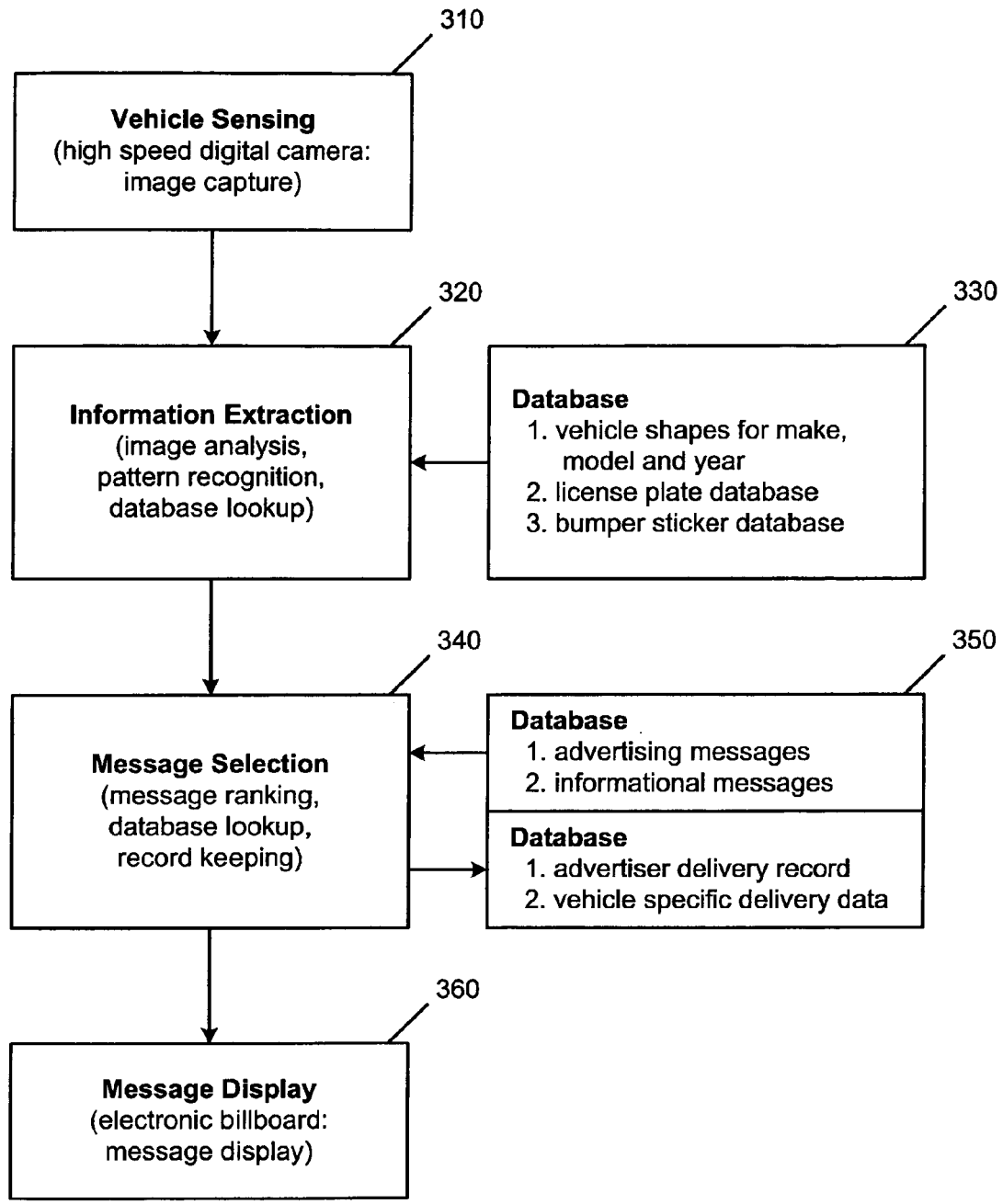
FIG. 3 illustrates a flow chart for an embodiment of the processing performed.

FIG. 3 illustrates steps involved in the processing of one embodiment of the present invention. The first step 310 is the capture of sensed image data. The second step 320 is the extraction of information from the sensed vehicle data. This involves image analysis and pattern recognition and preferably a database lookup. Pattern recognition algorithms are used to determine the outline of the vehicle and locate other information for which further processing is required.

The information extracted from each vehicle can consist of any subset of the following: make, model, year of manufacture, color, condition, license plate number, information from license plate frame, parking stickers, other bumper stickers, number of occupants, and other similar information.

After pattern recognition, a query is made of database 330 that can contain any of the following: outlines for vehicle makes, models and years; vehicle license plate data; and other information relating to bumper stickers (such as patterns for city parking stickers). The result of this query will be information relating to which message or messages should be displayed. This could consist of the zip code, projected age, projected income level, and projected sex of driver, or any other similar information. In alternative embodiments, database 330 may include face recognition data to permit individual people to be recognized. Database 330 may be stored locally within control unit 120, or may be queried remotely through network path 260.

The goal of the information extraction step 320 is to determine relevant information regarding the occupants of the vehicle. This relevant information would differ depending on the nature of the messages being delivered. In the case of advertising messages, the sex, age, residence location and income level may be most significant. In other cases merely the number of occupants may be used. The processing of the imaged information to determine the occupant information could take a variety of forms. In one scenario, a database of car license plate numbers would be used to simply look up the required information. The captured image of a license plate would be analyzed to determine the number and state of issuance and this information would be used to query the database.

In another scenarios, the make, model and year of the vehicle would be used to form a probable profile of the occupants. In this case the captured image or images would be analyzed, using pattern recognition techniques, to outline the vehicle shape and other defining characteristics. This information would be used to match against a database of makes, models and years of vehicles. Once the type of vehicle is determined, a profile of the occupants would be created to generate the relevant information. Other information such as parking stickers (indicating location of residence), license plate frame information (indicating where the vehicle was purchased or serviced), or political bumper stickers (indicating the political leaning of the owner) may be used to enhance this profile and come up with more accurate occupant information. The time of day and number of occupants may also be used for this purpose.

The next step in the processing is message selection 340. Message selection determines which message or messages should be displayed to the person or vehicle. This can be done by scoring the various messages based on the characteristics determined in the previous step and selecting the top-ranking message. In the case of advertising messages, a given advertiser may which to display advertisements only to people of a specific income level and age, for example. The processing may additionally involve the recording of which messages were delivered such that the advertiser can be billed accordingly.

This message selection step would differ depending on the nature of the messages being delivered. In the case of advertising messages, the advertisers may have determined for each message a target audience. Also there may be multiple advertisements that overlap in their potential relevance to the sensed vehicle. One mechanism would be to rank all advertisements based on their relevance and show the vehicle the most relevant message. This mechanism could also include information about how often a particular message has been shown (in order to distribute message delivery across as many advertisements as possible, for example). Another mechanism would be to randomly select a message among the group that is considered relevant to the sensed vehicle.

Database 350 is used to store messages and to update delivery information. Database 350 may be store locally in control unit 120 or may be queried and updated over network path 260. Message display step 360 is the final step and involves sending the selected message or messages at the appropriate times to display device 110.

An enhancement to the message selection mechanism would be to maintain for each vehicle data on whether a particular message has already been shown. This would be used control the variety and sequence of messages shown to a particular vehicle. For example, a certain vehicle that passes the display every weekday for commuting could be given a different message easy day. This feature would be accomplished by updating a database containing vehicle identifying information and advertisement delivery data every time a message is shown. With a large enough database, even a busy freeway in which several hundred thousand vehicles pass every day could be accommodated.

This message delivery database may need to contain more specific information than that used to come up with the occupant profile. For example, it may not be practical or legal to use the license plate number for information extraction, but it may be convenient to use this information in the message delivery database. It may also be necessary to record message delivery information in order to provide billing information to the advertisers, if a per-delivery charging model is used.

The foregoing description of preferred embodiments of the present invention has been provided for the purpose of illustration and description. It is not exhaustive or limiting of the invention. Many modifications and variations will be apparent to practitioners skilled in the art.

What is claimed is:

1. An apparatus for presenting unsolicited information from a set of unsolicited information to at least one of a vehicle and an individual, comprising:
   a first circuit configured to receive characteristic information from the at least one of the vehicle and the individual;
   a second circuit configured to analyze the characteristic information to produce a predicted profile, to assign a score to each unsolicited information in the set of unsolicited information based on the predicted profile, to use the predicted profile to select the unsolicited information from the set of unsolicited information, and to record an instance of a selection of the unsolicited information from the set of unsolicited information; and
   a third circuit configured to transmit the unsolicited information from the set of unsolicited information.

2. The apparatus of claim 1, further comprising:
   a sensing device coupled to the first circuit and configured to sense the characteristic information from the at least one of the vehicle and the individual.

3. The apparatus of claim 2, wherein the sensing device is a camera.

4. The apparatus of claim 3, wherein the camera is positioned to capture an image of at least one of a front of the at least one of the vehicle and the individual along an expected route of travel and a back of the at least one of the vehicle and the individual along the expected route of travel.

5. The apparatus of claim 3, wherein the camera is at least one of a digital camera and an infrared camera.

6. The apparatus of claim 2, wherein the sensing device is an optical sensor.

7. An apparatus for presenting unsolicited information from a set of unsolicited information to at least one of a vehicle and an individual, comprising:
   a sensing device configured to sense characteristic information from the at least one of the vehicle and the individual;
   a first circuit configured to receive the characteristic information from the sensing device;
   a second circuit configured to analyze the characteristic information to produce a predicted profile, to assign a score to each unsolicited information in the set of unsolicited information based on the predicted profile, and to use the predicted profile to select the unsolicited information from the set of unsolicited information; and
   a third circuit configured to transmit the unsolicited information from the set of unsolicited information;
   wherein the sensing device is configured to sense radio frequency energy emitted from the at least one of the vehicle and the individual.

8. The apparatus of claim 2, wherein the sensing device is an audio sensor.

9. The apparatus of claim 1, further comprising:
   a display device coupled to the third circuit and configured to present the unsolicited information from the set of unsolicited information.

10. The apparatus of claim 9, wherein the display device is an electronic billboard.

11. The apparatus of claim 1, further comprising:
    at least one of a memory and a network interface coupled to the second circuit, wherein information in a database is communicable with the second circuit via the at least one of the memory and the network interface.

12. The apparatus of claim 1, wherein the characteristic information is an image of the at least one of the vehicle and the individual and the second circuit is configured to recognize a pattern in the image.

13. An apparatus for presenting unsolicited information from a set of unsolicited information to at least one of a vehicle and an individual, comprising:
    a first circuit configured to receive characteristic information from the at least one of the vehicle and the individual;
    a second circuit configured to analyze the characteristic information to produce a predicted profile, to assign a score to each unsolicited information in the set of unsolicited information based on the predicted profile, and to use the predicted profile to select the unsolicited information from the set of unsolicited information; and
    a third circuit configured to transmit the unsolicited information from the set of unsolicited information;
    wherein the characteristic information is an image of the at least one of the vehicle and the individual; and
    wherein the second circuit is configured to extract at least one of a make of the vehicle, a model of the vehicle, a year of manufacture of the vehicle, a color of the vehicle, a condition of the vehicle, a license plate number of the vehicle, an information from a license plate frame on the vehicle, an information from a parking sticker on the vehicle, an information from a bumper sticker on the vehicle, and a number of occupants in the vehicle from the image.

14. The apparatus of claim 12, wherein the second circuit is configured for at least one of to compare the pattern with an information in a database, to process an algorithm to determine the pattern, and to determine an outline of the at least one of the vehicle and the individual.

15. The apparatus of claim 14, wherein the information in the database cross references the outline of the at least one of the vehicle and the individual with a make of the vehicle, a model of the vehicle, and a year of manufacture of the vehicle.

16. The apparatus of claim 14, wherein the information in the database includes at least one of vehicle license plate data, information related to bumper stickers, information related to parking stickers, and face recognition data.

17. The apparatus of claim 14, wherein the second circuit is configured to extract from the information in the database a zip code of at least one of the individual, an owner of the vehicle, and a driver of the vehicle.

18. The apparatus of claim 14, wherein the second circuit is configured to extract from the information in the database an estimated age of at least one of the individual, an owner of the vehicle, and a driver of the vehicle.

19. The apparatus of claim 14, wherein the second circuit is configured to extract from the information in the database an estimated income of at least one of the individual, an owner of the vehicle, and a driver of the vehicle.

20. The apparatus of claim 14, wherein the second circuit is configured to extract from the information in the database an estimated sex of at least one of the individual, an owner of the vehicle, and a driver of the vehicle.

21. The apparatus of claim 1, wherein the second circuit is configured to cross reference the characteristic information with an information in a database to produce the predicted profile.

22. An apparatus for presenting unsolicited information from a set of unsolicited information to at least one of a vehicle and an individual, comprising:
    a first circuit configured to receive characteristic information from the at least one of the vehicle and the individual;
    a second circuit configured to analyze the characteristic information to produce a predicted profile, to assign a score to each unsolicited information in the set of unsolicited information based on the predicted profile, and to use the predicted profile to select the unsolicited information from the set of unsolicited information; and
    a third circuit configured to transmit the unsolicited information from the set of unsolicited information;
    wherein the second circuit is configured to produce the predicted profile based on at least one of a make of the vehicle, a model of the vehicle, a year of manufacture of the vehicle, an information from a parking sticker on the vehicle, an information from a license plate frame on the vehicle, an information from a bumper sticker on the vehicle, a time of day, and a number of occupants in the vehicle.

23. The apparatus of claim 22, wherein the set of unsolicited information is all unsolicited information deemed to be relevant based on the predicted profile.

24. The apparatus of claim 1, wherein the second circuit is configured to select randomly the unsolicited information from a set of relevant unsolicited information, wherein the set of unsolicited information is all unsolicited information deemed to be relevant based on the predicted profile.

25. The apparatus of claim 1, wherein the second circuit is further configured to communicate with a fourth circuit configured to process a charge to an advertiser for the instance of the selection of the unsolicited information from the set of unsolicited information.

26. An apparatus for presenting unsolicited information from a set of unsolicited information to at least one of a vehicle and an individual, comprising:
    a first circuit configured to receive characteristic information from the at least one of the vehicle and the individual;
    a second circuit configured to analyze the characteristic information to produce a predicted profile, to assign a score to each unsolicited information in the set of unsolicited information based on the predicted profile, to use the predicted profile to select the unsolicited information from the set of unsolicited information, and to track a frequency at which the unsolicited information from the set of unsolicited information is selected; and
    a third circuit configured to transmit the unsolicited information from the set of unsolicited information.

27. An apparatus for presenting unsolicited information from a set of unsolicited information to at least one of a vehicle and an individual, comprising:
    a first circuit configured to receive characteristic information from the at least one of the vehicle and the individual;
    a second circuit configured to analyze the characteristic information to produce a predicted profile, to assign a score to each unsolicited information in the set of unsolicited information based on the predicted profile, to use the predicted profile to select the unsolicited information from the set of unsolicited information, and to maintain information about the vehicle to which the unsolicited information from the set of unsolicited information has been presented; and
    a third circuit configured to transmit the unsolicited information from the set of unsolicited information.

28. The apparatus of claim 27, wherein the second circuit is further configured to control a variety of sequencing a selection from the set of unsolicited information.

29. A system for presenting unsolicited information from a set of unsolicited information to at least one of a vehicle and an individual, comprising:
    a sensing device configured to sense characteristic information from the at least one of the vehicle and the individual;
    a processor configured to receive the characteristic information from the at least one of the vehicle and the individual, to analyze the characteristic information to produce a predicted profile, to assign a score to each unsolicited information in the set of unsolicited information based on the predicted profile, to use the predicted profile to select the unsolicited information from the set of unsolicited information, to record an instance of a selection of the unsolicited information from the set of unsolicited information, and to transmit the unsolicited information from the set of unsolicited information; and
    a display device configured to present the unsolicited information from the set of unsolicited information.

30. A computer program product for presenting unsolicited information from a set of unsolicited information to at least one of a vehicle and an individual, the computer program product having computer program code embodied in a computer readable storage medium, the computer program code comprising:
    first program code configured to cause the computer system to receive characteristic information from the at least one of the vehicle and the individual;
    second program code configured to cause the computer system to analyze the characteristic information to produce a predicted profile;
    third program code configured to cause the computer system to assign a score to each unsolicited information in the set of unsolicited information based on the predicted profile;
    fourth program code configured to cause the computer system to use the predicted profile to select the unsolicited information from the set of unsolicited information;
    fifth program code configured to cause the computer system to transmit the unsolicited information from the set of unsolicited information; and
    sixth program code configured to cause the computer system to record an instance of a selection of the unsolicited information from the set of unsolicited information.

31. The computer program product of claim 30, wherein the characteristic information is an image of the at least one of the vehicle and the individual and the second program code is configured to cause the computer system to recognize a pattern in the image.

32. The computer program product of claim 31, wherein the second program code is configured to cause the computer system to extract at least one of a make of the vehicle, a model of the vehicle, a year of manufacture of the vehicle, a color of the vehicle, a condition of the vehicle, a license plate number of the vehicle, an information from a license plate frame on the vehicle, an information from a parking sticker on the vehicle, an information from a bumper sticker on the vehicle, and a number of occupants in the vehicle from the image.

33. The computer program product of claim 31, wherein the second program code is configured for at least one of to cause the computer system to compare the pattern with an information in a database, to cause the computer system to process an algorithm to determine the pattern, and to cause the computer system to determine an outline of the at least one of the vehicle and the individual.

34. The computer program product of claim 33, wherein the second program code is configured to cause the computer system to extract from the information in the database a zip code of at least one of the individual, an owner of the vehicle, and a driver of the vehicle.

35. The computer program product of claim 33, wherein the second program code is configured to cause the computer system to extract from the information in the database an estimated age of at least one of the individual, an owner of the vehicle, and a driver of the vehicle.

36. The computer program product of claim 33, wherein the second program code is configured to cause the computer system to extract from the information in the database an estimated income of at least one of the individual, an owner of the vehicle, and a driver of the vehicle.

37. The computer program product of claim 33, wherein the second program code is configured to cause the computer system to extract from the information in the database an estimated sex of at least one of the individual, an owner of the vehicle, and a driver of the vehicle.

38. The computer program product of claim 30, wherein the second program code is configured to cause the computer system to cross reference the characteristic information with an information in a database to produce the predicted profile.

39. The computer program product of claim 30, wherein the second program code is configured to cause the computer system to produce the predicted profile based on at least one of a make of the vehicle, a model of the vehicle, a year of manufacture of the vehicle, an information from a parking sticker on the vehicle, an information from a license plate frame on the vehicle, an information from a bumper sticker on the vehicle, a time of day, and a number of occupants in the vehicle.

40. The computer program product of claim 30, wherein the third program code is configured to cause the computer system to select randomly the unsolicited information from the set of relevant unsolicited information, wherein the set of unsolicited information is all unsolicited information deemed to be relevant based on the predicted profile.

41. The computer program product of claim 30, further comprising:
sixth program code configured to cause the computer system to track a frequency at which the unsolicited information from the set of unsolicited information is selected.

42. The computer program product of claim 30, further comprising:
sixth program code configured to cause the computer system to maintain information about the vehicle to which the unsolicited information from the set of unsolicited information has been presented.

* * * * *